Jan. 7, 1969   J. T. MAYNARD ET AL   3,421,027
CONTROL FOR DYNAMOELECTRIC MACHINE HAVING A PAIR OF
CAPACITIVE TIMING CIRCUITS INTERCONNECTED TO
CONTROL FIRING OF A TRIGGERED SWITCH
Filed Oct. 22, 1965
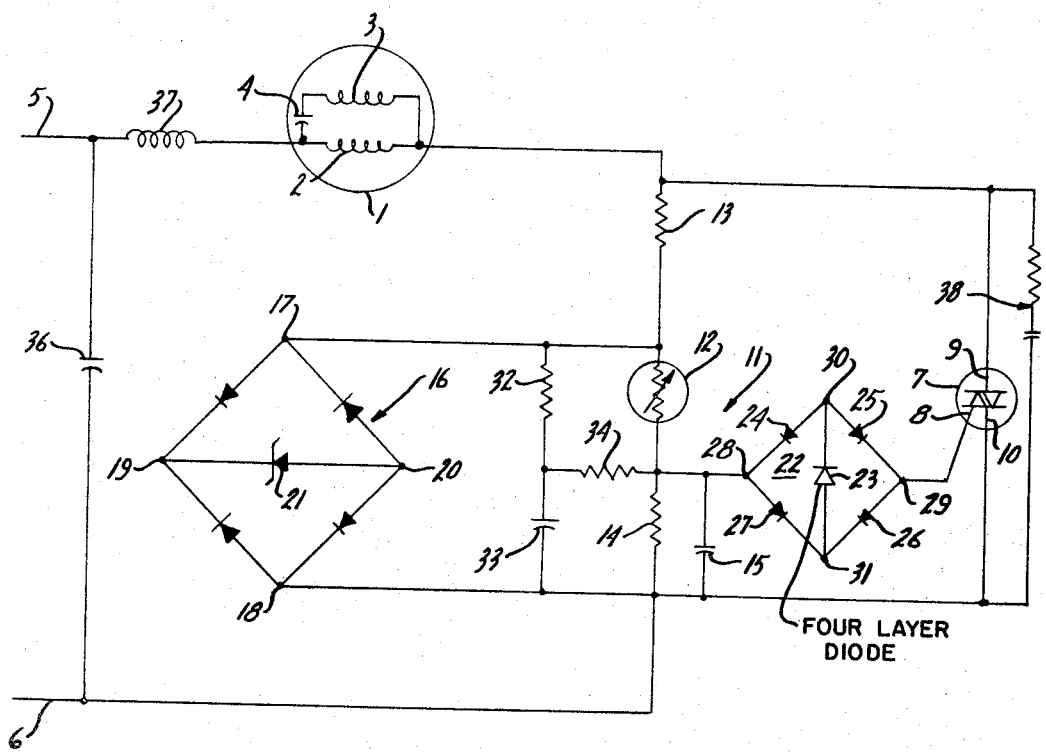
INVENTORS
JOHN T. MAYNARD
JOHNNY DAH-CHUN YU
BY
Merl E. Sceales
Attorney

United States Patent Office 3,421,027
Patented Jan. 7, 1969

---

3,421,027
CONTROL FOR DYNAMOELECTRIC MACHINE HAVING A PAIR OF CAPACITIVE TIMING CIRCUITS INTERCONNECTED TO CONTROL FIRING OF A TRIGGERED SWITCH
John T. Maynard, New Berlin, Wis., and Johnny Dah-Chun Yu, Dayton, Ohio, assignors to A. O. Smith Corporation, Milwaukee, Wis., a corporation of New York
Filed Oct. 22, 1965, Ser. No. 500,967
U.S. Cl. 307—293
Int. Cl. H03k 17/26
3 Claims

ABSTRACT OF THE DISCLOSURE

This disclosure relates to a motor connected to the power lines in series with a "Triac" switch having a firing terminal or gate to establish the conductive state during a half cycle of an alternating current input. A trigger signal is generated by a timing circuit including a thermistor connected in a series with a capacitor. A resistor is connected in parallel with the capacitor. A voltage regulator is connected across the timing circuit. An additional resistor in series with a capacitor is connected in parallel with the thermistor and the first capacitor with a resistor connecting the top sides of the two capacitors. A full wave diode bridge circuit includes a "Diac" diode between the direct current terminals and the input terminals connected between the junction of the capacitor and the thermistor and the "Triac" switch gate.

---

This invention relates to a condition responsive control circuit and particularly to a condition responsive speed control circuit for a permanent split capacitor motor and the like.

Alternating current motors and particularly permanent split capacitor motors have recently become of general interest in variable speed motor applications with the development of reliable, simple and relatively inexpensive solid state control circuits. For example, the co-pending application entitled Condition Responsive Controlled Circuit of John T. Maynard which was filed on Oct. 22, 1965, with Ser. No. 500,968, and is assigned to a common assignee with this application discloses a particularly satisfactory semi-conductor circuit for speed control of a motor.

Generally, in accordance with the illustrated control circuit of the above application, the motor is connected to the power lines in series with a triggered symmetrical switching device having the characteristic of normally maintaining an open circuit condition. If a signal is applied to a firing terminal or gate of the device, it is switched to a highly conductive state and continues to conduct for the balance of the half cycle of the alternating current. The switching device inherently returns to a nonconducting condition when the current drops to zero and reverses. The firing signal is applied through a symmetrical switching device which maintains an essentially open circuit condition until a selected breakdown voltage is applied across the device after which it conducts. The trigger signal is generated by an alternating current network including a thermistor or other temperature sensitive element connected in a timing circuit with a capacitor. A voltage regulator is connected across the timing circuit to provide an improved response and overall control. As the temperature changes, the resistance changes and varies the time constant of the timing circuit. This in turn varies the time in each half cycle that the capacitor reaches the firing level the discharges through the firing circuit to trigger the switching device and reset the timing circuit for functioning during the subsequent half cycle.

The present invention is particularly directed to an improvement and modification of the timing and triggering circuit to increase the sensitivity and response of the circuit whereby the voltage impressed upon the motor varies between a minimum output and a full output for a relatively small temperature variation and which minimizes the generation of a direct current component in the motor circuit.

In accordance with the present invention, the regulated timing circuit includes an additional resistor-capacitor network connected in parallel with the thermistor controlled timing circuit. Further, the symmetrical voltage responsive switch which connects the timing circuit to the gate of the controlled symmetrical switch is constructed with a full wave diode bridge circuit with a control diode in the direct current branch and the alternating current input terminals connected between the timing circuit and the controlled switch.

The present invention has been found to provide an improvement in the overall characteristic of the motor operation and particularly minimizing of the generation of a direct current component in the motor power circuit.

The drawing furnished herewith illustrates preferred constructions of the present invention for which the above advantages and features are clearly shown as well as others which will be clear from the following description.

In the drawings:

The figure is a schematic circuit diagram of a split capacitor motor control circuit constructed in accordance with the present invention.

Referring to the drawing, a permanent split capacitor motor 1 is schematically shown including a main winding 2 connected in parallel with an auxiliary winding 3 and a capacitor 4. The parallel motor winding circuit is connected to suitable alternating current power leads 5 and 6 in series with a triggered symmetrical switch 7 shown schematically as a "Triac" in accordance with the illustration in the Aug. 19, 1964 issue of Home Appliance Builder.

Briefly, the switch 7 functions as a pair of paralleled and oppositely polarized controlled rectifiers but with a single gate 8 controlling conduction between a pair of main electrodes or terminals 9 and 10, connected respectively to the one side of paralleled motor windings 2 and 3 and to the power line 6. Switch 7 is normally nonconducting and thus opens the motor winding circuit. A current at the gate 8 triggers the switch 7 to conduct in either direction and for the corresponding half cycle of the alternating current power. The switch 7 automatically turns off or becomes nonconducting when the current drops to zero and reverses and does not turn on until another signal is applied to the gate.

The switch 7 is controlled by a temperature sensing control circuit 11 connected to the alterating current power lines 5 and 6 in series with motor 1.

The circuit 11 includes a thermistor 12 connected in series between a pair of fixed resistors 13 and 14 across lines 5 and 6 to form a voltage dividing network. A capacitor 15 is connected in parallel with the resistor 14 to form a timing circuit. A diode bridge voltage regulator 16, more fully described in the previously identified application of John T. Maynard, is connected across the themistor 12 and the paralleled resistor 14 and capacitor 15 to provide a constant voltage across the timing circuit. Briefly, regulator 16 is a full wave diode bridge having alternating current terminals 17 and 18 connected to opposite sides of the timing circuit and direct current terminals 19 and 20. A Zener diode 21 is connected between terminals 19 and 20 and provides an essentially constant voltage across the timing circuit. The timing circuit described above corresponds to that shown in the previously identified application of John T. Maynard. The junction of thermistor 12 and capacitor 15 is connected in series with a voltage controlled switch 22 forming one feature of this invention to the gate 8 of the switch 7.

The switch 22 forming a part of the present invention includes a breakdown diode 23 connected in circuit through a full wave bridge rectifier. Diode 23 is selected to have a predetermined breakdown voltage sufficient to provide triggering of the triggered symmetrical switch 7. An economical diode 23 having the desired characteristic has been found to be a rejected symmetrical diode unit sold under the trade name "Diac" or a similar device sold by Texas Instruments and as more fully disclosed in applicant's copending application intended to operate as a symmetrical diode switch to conduct during both half cycles of an applied alternating voltage of sufficient amplitude. The reject symmetrical diodes provide reliable and repeatable operation during only one half of the cycle but are readily available at low cost. The diode bridge circuit permits use of the reliable portion of such symmetrical diodes.

The symmetrical diode bridge includes four conventional silicon diodes 24–27 having an extremely low forward voltage. The diodes 24–27 are connected in a closed loop to define a pair of alternating current terminals 28 and 29 and a pair of direct current terminals 30 and 31 at opposed junctions. The alternating current input terminals 28 and 29 are connected respectively to the timing circuit 11 and to the firing gate 8 of the symmetrical triggered switch 7. The breakdown diode 23 is connected across the direct current terminals 30 and 31.

During one half cycle of the timing circuit the capacitor 15 charges to one polarity related to the positive or negative half cycle of the alternating current supply. If lead 5 is positive relative to lead 6, the capacitor 15 charges with a positive potential at the junction to thermistor 12. The positive capacitor voltage is applied to the one bridge input terminal 18 and to the switch element 10. The circuit is biased by the capacitor voltage to conduct from the capacitor through the bridge diode 27, the breakdown diode 23 to the opposite output terminal 30 and through the bridge diode 25 to the other terminal 29 connected directly to the gate 8, through the symmetrical switch 7 to element 10 to the negative side of the capacitor 15. At a selected voltage, the diode 23 breaks down and conducts to complete the above circuit and establish a current through the circuit of gate 8 to fire the symmetrical switch 7. Once fired, switch 7 continues to conduct for the balance of the half cycle of the current in the main circuit of motor 1 and switch 7.

During the opposite half cycle the capacitor 15 charges to the opposite polarity. This voltage is applied across the switch 22 and the gate circuit in the opposite direction with the positive potential applied to the terminal 10 and the negative potential applied through the diode switch 22 to gate 8. The potential applied across the voltage breakdown diode 23 remains in the same direction as in the first half cycle, with diodes 26 and 24 being active to conduct from the terminal 29, diode 26 to terminal 31, breakdown diode 23 to terminal 30 and diode 24 to terminal 28. At the selected voltage determined by breakdown diode 23, the switch 22 effectively closes and provides gate current flow through the gate circuit of the symmetrical triggered switch 7. Due to its characteristic, the switch 7 fires and conducts during the balance of the negative half cycle to apply a corresponding portion of the half cycles to the motor 1.

In order to maintain the desired action it is found necessary to provide an increased stabilization circuit in the timing circuit 11 consisting of a resistor 32 and a capacitor 33 connected in series across the thermistor 12 and the parallel network of the capacitor 15 and the resistor 14. Additionally, a resistor 34 interconnects the junction of the resistor 32 and the capacitor 33 to the junction of the thermistor 12 and the capacitor 15.

The additional timing circuitry appears to function in the manner to shift the charging phase or time to more rapidly charge the capacitor and negate the generation of a direct current component. Although the circuit is operative during the complete operation, the greatest action occurs at higher resistances of the thermistor 12 when the time constant of the circuit is relatively large.

A capacitor 36 is connected directly across lines 5 and 6 with a choke coil 37 in line 5 forming a radio frequency filter to decouple circuits when two motors are operated in parallel from the same lines and a resistor-capacitor branch 38 is connected across the switch 7 as in the previously identified Maynard application.

The circuit operation is summarized as follows.

When power is applied, the full voltage is applied across the timing circuit 11. The regulator 16 clips the top or peak of the successive half cycles and an essentially constant voltage is applied across the timing circuit. The charge on the capacitor 15 increases during each half cycle and after a period reaches a level sufficient to break down the diode 23 of switch 22 as previously described. When the switch 22 conducts, a current discharge path for the capacitor is provided through the switch 22 and the gate 8 of the triggered symmetrical switch 7. The symmetrical switch 7 is thus fired to conduct and continues to conduct during the corresponding half cycle and until the current reverses to apply the corresponding portion of the current to the motor 1.

The resistors 32 and 34 and capacitor 33 provide an additional timing circuit which has been found to modify the response of the main circuit and in combination with the special diode bridge switch 22 accurately fires the switch 7 at essentially the same point in each half cycle and thereby minimizes the direct current component in the motor circuit. The switch 22 applies the same voltage to diode 23 and thus always operates in the same characteristic of the diode 23 with a resulting improvement in symmetry of the firing point in any half cycle.

During the opposite half cycle, the capacitor 15 similarly charges in the opposite direction. As a result of the bridge circuit, however, the voltage across diode 23 of switch 22 remains as in the previous half cycle and diode 23 fires to supply firing current and the triggered symmetrical switch 7 at the appropriate point and a corresponding portion of the opposite half cycle is impressed on the motor 1.

The motor 1 operates to drive the load at a speed related to the power pulses impressed thereon. For example, the motor 1 may be connected to drive an air furnace as suggested in applicant's previously identified copending application or a refrigerating compressor as shown in U.S. Patent 3,196,629 to vary a temperature condition to which the thermistor 12 is subjected. As the sensed temperature changes, the resistance of the thermistor 12 varies. Both the voltage division and the time constant of the timing circuit of thermistor 12 and capacitor 15 is changed such that the firing point during the successive half cycles shifts and the power supplied to the motor 1 increases or decreases to correct the motor speed until a set point temperature is obtained. The circuit thus provides continuous variation or modulation of the energization of the motor 1 to maintain the thermistor 12 at a preselected set point.

A highly satisfactory motor control circuit corresponding to that shown in the drawing has the following specifications:

Switch 7—General Electric SC41D, 400 volts, 6 amps.
Diode 21—VR 56, 56 volt Zener.
Diodes 24–27—IN 4001, 100 volts.
Diodes (circuit 16)—IN 4002, 200 volts.
Thermistor 12—GA 45 P2—500,000 ohms, potentiometer in series with a 15,000 ohm resistor.
Resistor 13—33,000 ohms, IRC, 10%–2 watts.
Resistor 14—39,000 ohms, IRC, 10%–2 watts.
Resistor 32—68,000 ohms, IRC, 10%–1 watt.
Resistor 34—47,000 ohms, IRC, 10%–1 watt.

Capacitor 15—Cornell-Dubilier Co., CDE, WMF, 0.047 mfd., 200 v. D.C.
Capacitor 33—CDE, WMF, 0.1 mfd., 200 v. D.C.
Capacitor 36—CDE, WMF, 0.1 mfd., 600 v. D.C.
Resistor and capacitor 38—100 ohms, IRC, 10%–2 watts. CDE, WMF, 0.1 mfd., 600 v. D.C.
Diode 23—Texas Instrument PNPN trigger.
Choke coil 37.

Various modes of carrying out the invention are contemplated as being within the scope of the following claims particularly pointing out and distinctly claiming the subject matter which is regarded as the invention.

We claim:
1. In a control for an alternating current dynamoelectric machine connected to alternating current power terminals in series with a symmetrical triggered circuit means with a gate means for applying corresponding portions of an alternating current wave on the machine and having a main resistor and capacitor timing circuit means having a main capacitor connected across said power terminals and charged to opposite polarities by the alternate half cycles of the input voltage for actuating the triggered circuit means, the improvement in the firing circuit comprising a capacitive timing circuit means connected in circuit with the main capacitive timing means between said power terminals and modifying the charging characteristic of the main capacitor, and a full wave rectifying means having alternating current input terminals connected between the main capacitor and the gate means and having direct current terminals, and a four layer diode means connected across said direct current terminals such that the same polarity voltage is impressed thereon for both capacitor polarities, said four layer diode means wholly discharging said capacitor.

2. The control of claim 1 wherein a modifying capacitor is connected in parallel with the main capacitor and a condition sensitive resistance element is connected in series between one of said power terminals and said paralleled capacitors to vary the time constants and the period required to increase the main capacitor voltage to the firing level of the voltage breakdown switch.

3. The control of claim 1, wherein the main timing circuit means includes a condition sensitive resistance element connected in series parallel circuit with the main capacitor and a resistor and the modifying timing circuit means includes a control resistor in series with a control capacitor connected across the series parallel circuit with the control resistor connected to the one end of the resistance element and the control capacitor connected to the one end of the main capacitor, and a resistor connected at one end to the common junctions of the condition sensitive resistance element and main capacitor and at the opposite end to the common junction of the control resistor and control capacitor.

References Cited
UNITED STATES PATENTS

| | | | |
|---|---|---|---|
| 3,252,010 | 5/1966 | Buttenhoff | 307—88.5 |
| 3,256,426 | 6/1966 | Roth et al. | 328—127 XR |
| 3,346,874 | 10/1967 | Howell | 307—88.5 |

OTHER REFERENCES

PUB I, "Triac Control for A.C. Power," in application note by E. K. Howell, General Electric, 200.35, dated May 1964 pp. 1–7.

PUB II "A.C. Motor Speed Control," by Mungenast et al. in Home Appliance Builder, August 1964, pp. 13–15 and 38.

JOHN S. HEYMAN, *Primary Examiner.*

S. D. MILLER, *Assistant Examiner.*

U.S. Cl. X.R.

307—252, 258, 305, 321, 324; 318—309